United States Patent
Hendricks et al.

(10) Patent No.: US 10,976,746 B2
(45) Date of Patent: Apr. 13, 2021

(54) SYSTEM AND METHOD TO MARK AUTONOMOUS WORK AREA

(71) Applicant: Caterpillar Paving Products Inc., Brooklyn Park, MN (US)

(72) Inventors: Kyle Hendricks, St. Francis, MN (US); Jeremy Lee, Otsego, MN (US); Timothy O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 157 days.

(21) Appl. No.: 16/235,234

(22) Filed: Dec. 28, 2018

(65) Prior Publication Data

US 2020/0209879 A1    Jul. 2, 2020

(51) Int. Cl.
*G05D 1/02* (2020.01)
*B65H 75/42* (2006.01)
*G05D 1/00* (2006.01)

(52) U.S. Cl.
CPC ......... *G05D 1/0234* (2013.01); *G05D 1/0214* (2013.01); *B65H 75/425* (2013.01); *G05D 1/0088* (2013.01)

(58) Field of Classification Search
CPC ... G05D 1/0234; G05D 1/0214; G05D 1/0088
See application file for complete search history.

(56) References Cited

U.S. PATENT DOCUMENTS

| | | | |
|---|---|---|---|
| 5,537,017 A | 7/1996 | Feiten et al. | |
| 6,119,057 A | 9/2000 | Kawagoe | |
| 2017/0289754 A1* | 10/2017 | Anderson | H04W 4/029 |
| 2020/0089248 A1* | 3/2020 | Coq | G05D 1/0088 |

FOREIGN PATENT DOCUMENTS

| | | |
|---|---|---|
| CN | 103472823 B | 11/2015 |
| CN | 103631262 B | 7/2017 |
| EP | 3167699 A1 | 5/2017 |
| JP | 2003170376 A | 6/2003 |
| JP | 2016189171 A | 11/2016 |

* cited by examiner

*Primary Examiner* — Imran K Mustafa
(74) *Attorney, Agent, or Firm* — Harrity & Harrity LLP

(57) ABSTRACT

System and methods for marking a work area boundary of an autonomous vehicle are disclosed. A system may receive an indication that boundary marking for a work area is to be activated, and may transmit an activation signal to a marking actuator based on receiving the indication that boundary marking for the work area is to be activated. The activation signal may cause the marking actuator to begin marking the boundary as a vehicle, that includes the system, traverses the boundary. The system may store information that identifies a plurality of marked locations along the boundary. The system may determine that boundary marking for the work area is to be deactivated, and may transmit a deactivation signal to the marking actuator based on determining that boundary marking for the work area is to be deactivated. The deactivation signal may cause the marking actuator to stop marking the boundary.

20 Claims, 6 Drawing Sheets

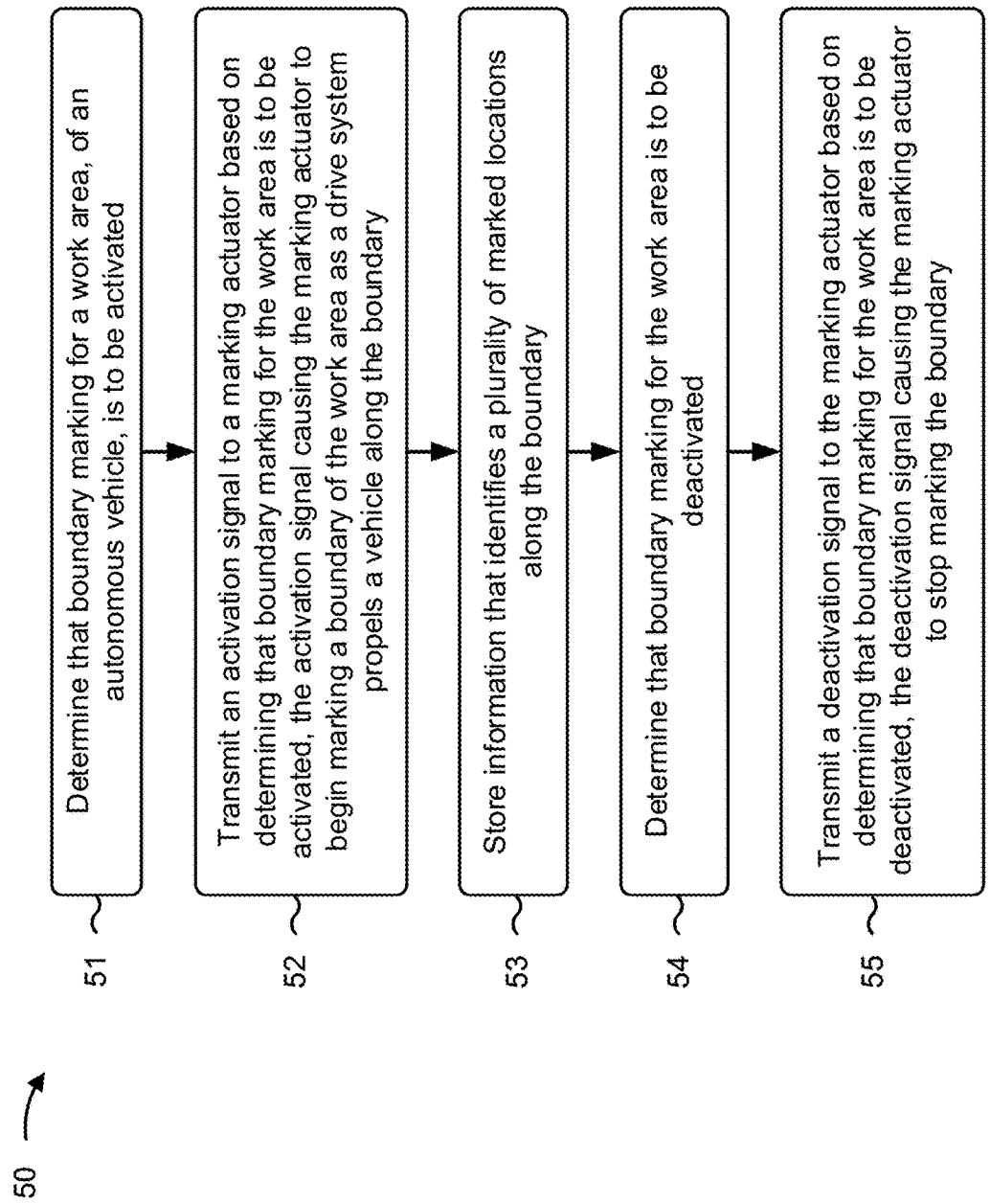

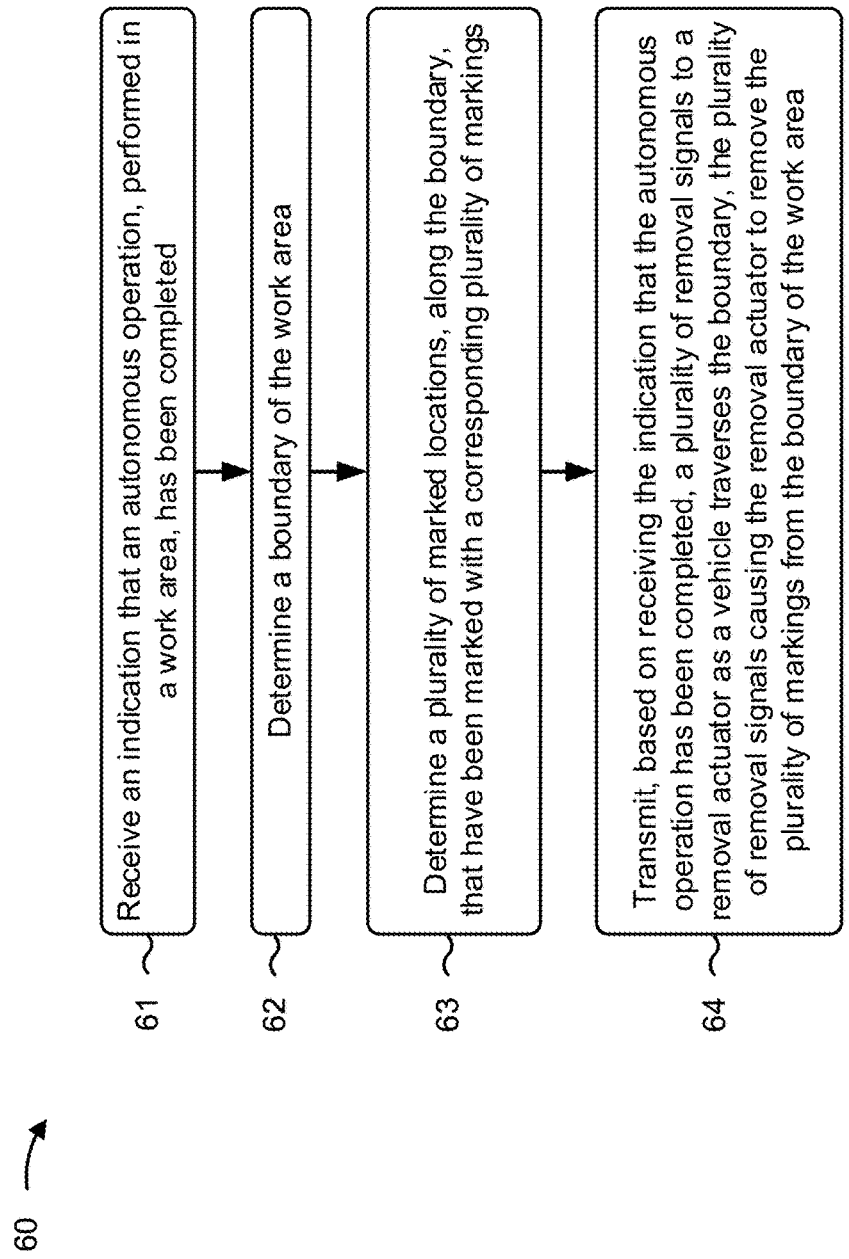

SYSTEM AND METHOD TO MARK AUTONOMOUS WORK AREA

TECHNICAL FIELD

The present disclosure relates generally to systems and methods for boundary marking and, more particularly, to systems and methods for marking a work area boundary of an autonomous vehicle.

BACKGROUND

When autonomous vehicles are used at a work site, special care must be taken to avoid collisions of the autonomous vehicle with other objects, including people, other vehicles, and/or the like. The likelihood of a collision may be reduced by marking a boundary of a work area of the autonomous vehicle. One device for marking a work area is described in U.S. Pat. No. 5,537,017 (the '017 patent) assigned to Siemens Aktiengesellschaft, which issued on Jul. 16, 1996. The '017 patent describes "a device and process . . . for exploring an unknown working area." The described device "has a sensor, which enables it to detect the area boundary and the markings. [The device] moves in the direction of the area boundary . . . and then runs parallel to the area boundary in the direction of movement . . . . When doing so, it applies at regular intervals markings . . . , which are at a distance from the area boundary . . . ."

In the '017 patent, the term "working area" refers to the area being explored by the device, starting from a predefined boundary that may be extended (i.e., the "working" being performed by the device is exploration). Therefore, the device of the '017 patent is not capable of autonomously marking an entire boundary of a work area of an autonomous vehicle (e.g., to reduce the likelihood of a collision while the vehicle is working).

The disclosed system is directed to overcoming one or more of the problems set forth above and/or other problems of the prior art.

SUMMARY

According to some implementations, the present disclosure is related to a system for marking a boundary of a work area of an autonomous vehicle. The system may include a memory, a marking actuator configured to mark the boundary of the work area, and a controller. The controller may be configured to receive an indication that boundary marking for the work area is to be activated, and to transmit an activation signal to the marking actuator based on receiving the indication that boundary marking for the work area is to be activated. The activation signal may cause the marking actuator to begin marking the boundary as a vehicle, that includes the system, traverses the boundary. The controller may be configured to store, in the memory, information that identifies a plurality of marked locations along the boundary. The controller may be configured to determine that boundary marking for the work area is to be deactivated, and to transmit a deactivation signal to the marking actuator based on determining that boundary marking for the work area is to be deactivated. The deactivation signal may cause the marking actuator to stop marking the boundary.

According to some implementations, the present disclosure is related to a vehicle for marking a boundary of a work area of an autonomous vehicle. The vehicle may include a drive system, a marking actuator configured to mark a boundary of a work area of an autonomous vehicle, and a control system. The control system may be configured to determine that boundary marking for the work area is to be activated, and to transmit an activation signal to the marking actuator based on determining that boundary marking for the work area is to be activated. The activation signal may cause the marking actuator to begin marking the boundary as the drive system propels the vehicle along the boundary. The control system may be configured to store information that identifies a plurality of marked locations along the boundary. The control system may be configured to determine that boundary marking for the work area is to be deactivated, and to transmit a deactivation signal to the marking actuator based on determining that boundary marking for the work area is to be deactivated. The deactivation signal may cause the marking actuator to stop marking the boundary.

According to some implementations, the present disclosure is related to a method performed by a control system of a vehicle. The method may include receiving, by the control system of the vehicle, an indication that an autonomous operation, performed in a work area, has been completed. The method may include determining, by the control system, a boundary of the work area, and determining, by the control system, a plurality of marked locations, along the boundary, that have been marked with a corresponding plurality of markings. The method may include transmitting, by the control system and based on receiving the indication that the autonomous operation has been completed, a plurality of removal signals to a removal actuator as the vehicle traverses the boundary. The plurality of removal signals may cause the removal actuator to remove the plurality of markings from the boundary of the work area.

Other features and implementations of this disclosure will be apparent from the following description and the accompanying drawings.

BRIEF DESCRIPTION OF THE DRAWINGS

FIGS. 5-6 are diagrams of example processes performed in association with the marking system of FIG. 2 and/or the vehicle of FIG. 1.

DETAILED DESCRIPTION

Figure 1:
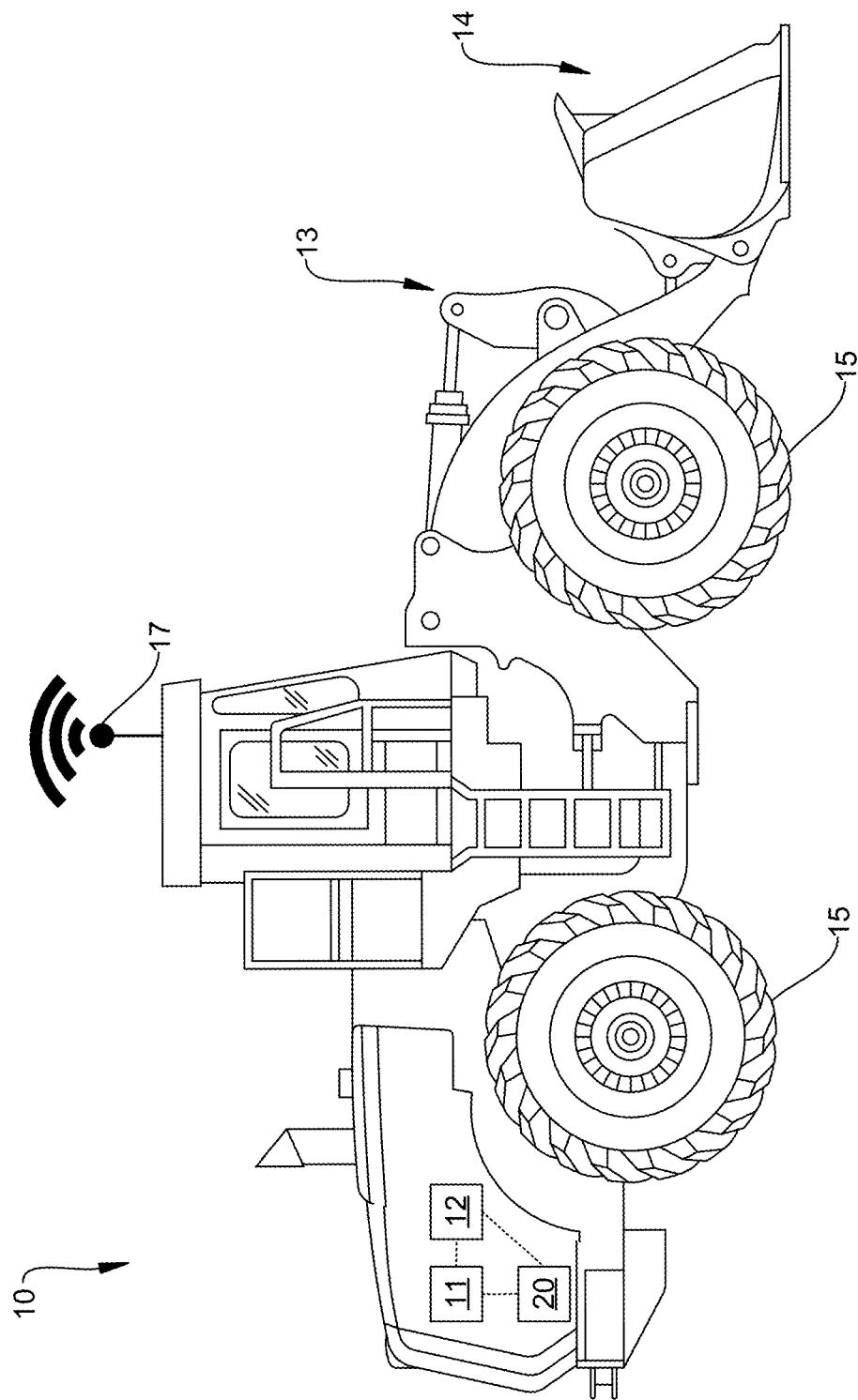
FIG. 1 is a diagram of an example vehicle.

FIG. 1 is a diagram of an example vehicle 10. Vehicle 10 may be, for example, a vehicle that performs operations associated with an industry such as mining, construction, farming, transportation, and/or any other industry. Vehicle 10 may be an earthmoving vehicle, such as a loader, as shown in FIG. 1. Although vehicle 10 is shown as a loader in FIG. 1, aspects of the disclosure are equally applicable to other types of vehicles, such as a paver, a scraper, a motor grader, a compactor, a dozer, a roller, a truck, a digger, an excavator, an all-terrain vehicle, a four wheeler, a utility vehicle, a utility task vehicle (UTV), a side-by-side vehicle, and/or the like. In some implementations, vehicle 10 may be an autonomous vehicle (e.g., an unmanned vehicle, a semi-autonomous vehicle, and/or the like) that performs operations using various sensors and/or controllers without an on-board operator and without a remote operator controlling vehicle 10 via remote control.

Vehicle 10 may include, among other things, a drive system 11, a transmission system 12, an implement linkage system 13, a work implement 14 (e.g., a bucket, a shovel, a scraper, and/or the like), multiple ground engaging members, and a global positioning system (GPS) component 17. The ground engaging members may be in the form of tracks for a track-type vehicle or a set of wheels 15, as shown in FIG. 1.

Drive system 11 may include an engine. Transmission system 12 may include gears, differential systems, axles, and/or other components that are coupled to drive system 11 and wheels 15 of vehicle 10. Transmission system 12 may be configured to transfer power from drive system 11 to wheels 15 in order to drive and/or propel vehicle 10. Implement linkage system 13 may be operatively coupled to work implement 14. Implement linkage system 13 may include hydraulically actuated linkages that enable articulation, linkage, and/or use of work implement 14 during operation. Work implement 14 may operatively perform functions such as, but not limited to, hauling, dumping, and/or removing materials. GPS component 17 may include, for example, a GPS antenna, a GPS receiver, and/or the like, and may be used to determine a location of the vehicle 10. Vehicle 10 may include a marking system 20, as described in more detail below.

As indicated above, FIG. 1 is provided as an example. Other examples may differ from what is described in connection with FIG. 1.

Figure 2:
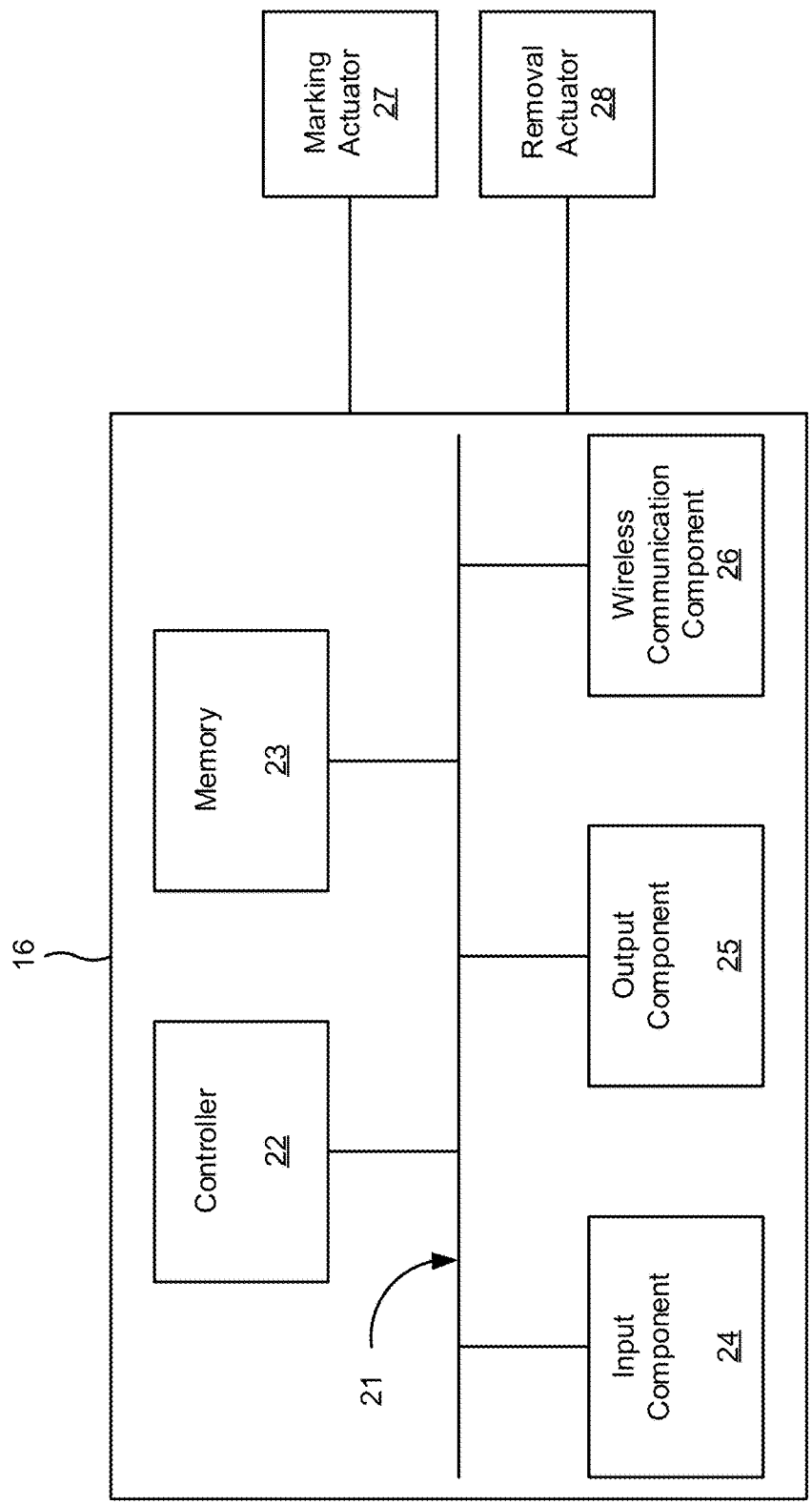
FIG. 2 is a diagram of an example marking system associated with marking a work area boundary.

FIG. 2 is a diagram of an example marking system 20 for marking a work area boundary. As shown in FIG. 2, marking system 20 may include a control system 16, a marking actuator 27, and a removal actuator 28. As further shown, control system 16 may include a bus 21, a controller 22, a memory 23, an input component 24, an output component 25, and a wireless communication component 26. One or more of the components of marking system 20 and/or control system 16 may be used as means for performing one or more operations described herein, such as process 50 of FIG. 5, process 60 of FIG. 6, and/or the like.

Bus 21 includes a component that permits communication among the components of control system 16. Controller 22 is implemented in hardware, firmware, and/or a combination of hardware and software. Controller 22 includes a processor, a central processing unit (CPU), a microprocessor, a microcontroller, a field-programmable gate array (FPGA), an application-specific integrated circuit (ASIC), or another type of processing and/or control component. Controller 22 includes one or more processors capable of being programmed to perform a function. Memory 23 includes a random access memory (RAM), a read only memory (ROM), a hard disk, a flash drive, and/or another type of dynamic or static storage device (e.g., a flash memory, a magnetic memory, and/or an optical memory) that stores information and/or instructions for use by controller 22.

Input component 24 includes a component that permits control system 16 to receive information, such as via operator input (e.g., a touch screen display, a keypad, a button, a switch, a microphone, and/or the like). Input component 24 may include a sensor for sensing information (e.g., a GPS component 17, an accelerometer, a gyroscope, a motion sensor, a LIDAR sensor, a radiofrequency (RF) sensor, a proximity sensor, and/or the like). Output component 25 includes a component that provides output information from control system 16 (e.g., a display, a speaker, a light-emitting diode (LED), and/or the like).

Wireless communication component 26 includes a transceiver and/or a separate receiver and transmitter that enables control system 16 to communicate with other devices, such as via a wireless connection, or a combination of wired and wireless connections. For example, wireless communication component 26 may include a radio frequency (RF) interface, a universal serial bus (USB) interface, a wireless local area network interface, a cellular network interface, and/or the like. Wireless communication component 26 may include an antenna for wireless communication.

Control system 16 may perform one or more processes described herein, such as process 50 of FIG. 5, process 60 of FIG. 6, and/or one or more other processes described herein. Control system 16 may perform these processes based on controller 22 executing software instructions stored by a non-transitory computer-readable medium, such as memory 23. A computer-readable medium is defined herein as a non-transitory memory device. A memory device includes memory space within a single physical storage device or memory space spread across multiple physical storage devices. Software instructions may be read into memory 23. When executed, software instructions stored in memory 23 may cause controller 22 to perform one or more processes described herein.

Control system 16 may interface with various systems of vehicle 10 (e.g., drive system 11, transmission system 12, implement linkage system 13, work implement 14, wheels 15, and/or the like). Additionally, or alternatively, control system 16 may interface with a marking actuator 27 and/or a removal actuator 28 associated with, attached to, and/or integrated in vehicle 10. Marking actuator 27 may perform operations to mark a boundary of a work area using one or more markings. Removal actuator 28 may perform operations to remove the one or more markings, or other markings. Control system 16 may provide one or more control signals to marking actuator 27 to control operation of marking actuator 27 (e.g., to activate boundary marking, to mark a location on the boundary, to deactivate boundary marking, and/or the like). Additionally, or alternatively, control system 16 may provide one or more control signals to removal actuator 28 to control operation of removal actuator 28 (e.g., to activate removal of markings, to initiate removal of a marking, to deactivate removal of markings, and/or the like).

Marking actuator 27 includes one or more components for marking a work area boundary, such as a component to drop an object, deposit a substance, create an impression in the ground, unspool a spooled article, emit light, and/or the like. For example, marking actuator 27 may include a cone dropper, a flag setter, a chalk layer, a paint sprayer, a cutting implement, a spooling component, a light-emitting component, and/or the like. Removal actuator 28 includes one or more components for removing markings from a work area boundary, such as a component to retrieve an object, remove or obscure a deposited substance, remove or obscure an impression in the ground, spool an article, stop emitting light, and/or the like. For example, removal actuator 28 may include a cone retriever, a flag retriever, a liquid sprayer, and/or the like. Marking actuator 27 and removal actuator 28 may be implemented in the same component, such as a component to drop and retrieve an object, unspool and spool an article, emit light and refrain from emitting light, and/or the like.

The number and arrangement of components shown in FIG. 2 are provided as an example. In practice, marking system 20 and/or control system 16 may include additional components, fewer components, different components, or differently arranged components than those shown in FIG. 2. Additionally, or alternatively, a set of components (e.g., one or more components) of marking system 20 and/or control system 16 may perform one or more functions described as being performed by another set of components of marking system 20 and/or control system 16.

Figure 3:
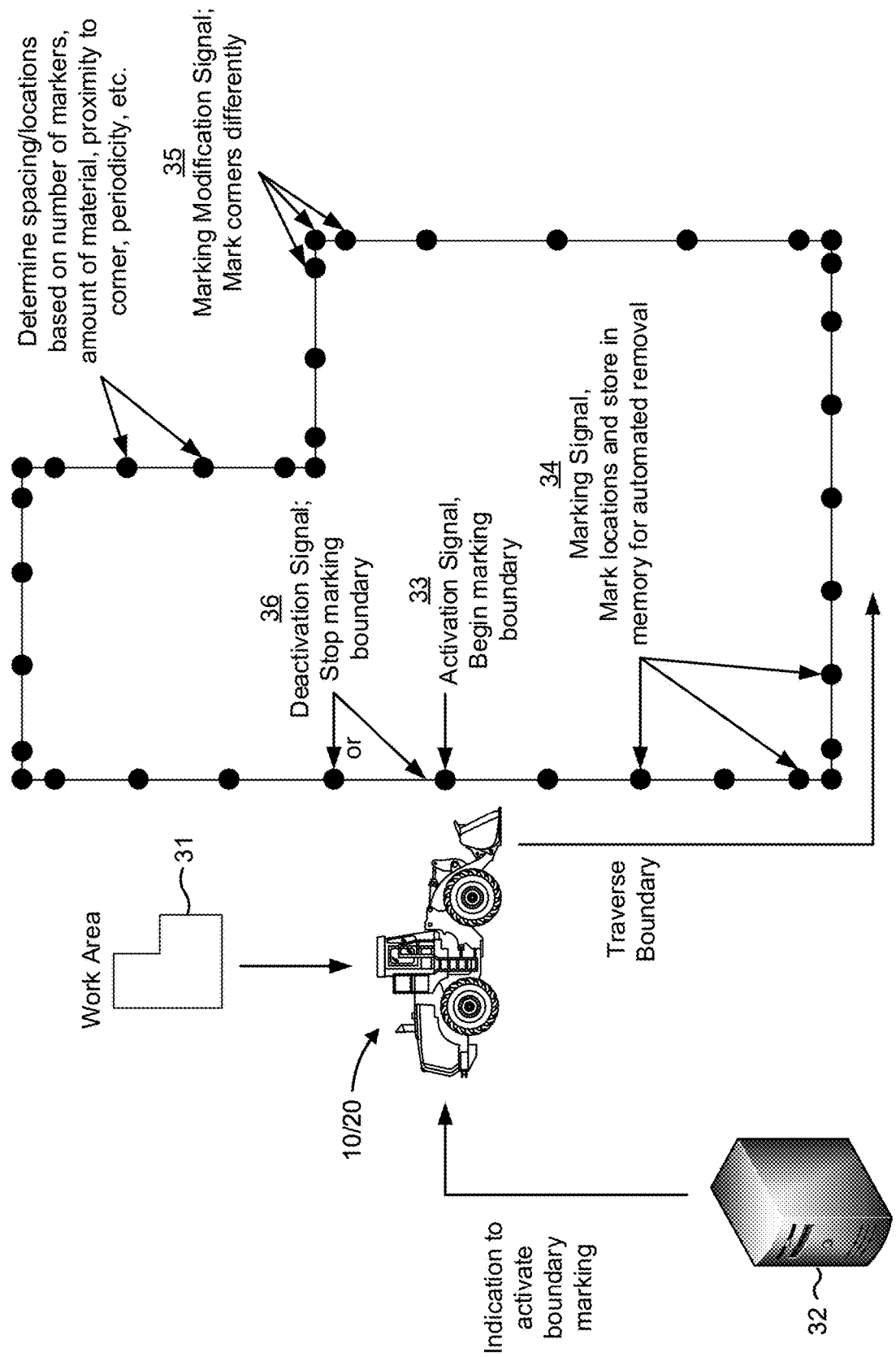
FIG. 3 is a diagram of example operations performed by the marking system of FIG. 2 and/or the vehicle of FIG. 1.

FIG. 3 is a diagram of example operations performed by marking system 20 and/or vehicle 10. While some operations are described in connection with FIG. 3 as being performed by vehicle 10, one or more of those operations may be performed by marking system 20.

As shown in FIG. 3, the vehicle 10 may determine a work area 31 to be reserved for an autonomous operation of the vehicle 10 and/or another vehicle. For example, vehicle 10 may be an autonomous vehicle configured to perform one or more operations in the work area 31 (e.g., after a boundary of the work area 31 is determined and/or marked), or may be a vehicle configured to mark a boundary of a work area 31 in which an autonomous vehicle, different from vehicle 10, is to operate.

A work area 31 may be defined by a set of geographic coordinates, which may define a boundary of the work area 31. Information that identifies the work area 31 may be input by an operator (e.g., using input component 24, information input to memory 23, and/or the like). Additionally, or alternatively, information that identifies the work area 31 may be received from a server 32, such as a command and control center server, a central server, a back office server, and/or the like. Additionally, or alternatively, an operator may define a boundary of a work area 31 by driving the vehicle 10 (e.g., physically or remotely) around the boundary of the work area 31. Although the work area 31 is shown with a particular shape, the work area 31 may have a different shape (e.g., a rectangle, a square, any other polygon, a circle, an oval, combinations thereof, and/or the like). In some cases, the work area 31 may include one or more corners. Alternatively, the work area 31 may not include any corners.

As further shown in FIG. 3, the vehicle 10 may receive an indication that boundary marking for the work area 31 is to be activated. In some implementations, the indication may be received from the server 32. Additionally, or alternatively, the indication may be received from an operator of vehicle 10 (e.g., via input component 24, wireless communication component 26, and/or the like). In some cases, the vehicle 10 (e.g., the control system 16) may receive an indication of a starting point on the boundary to begin marking, and may autonomously drive to the starting point to begin marking the boundary.

Based on receiving the indication to active boundary marking for the work area 31 (and/or based on determining that the vehicle 10 is located at the starting point), the control system 16 may transmit an activation signal 33 to the marking actuator 27. The activation signal 33 causes the marking actuator 27 to begin marking the boundary. For example, the activation signal 33 (and/or a marking signal 34, as described below) may cause the marking actuator 27 to drop an object (e.g., a cone, a flag, and/or the like), deposit a substance (e.g., chalk, paint, and/or the like), create an impression in a ground surface (e.g., using a cutting implement, a drilling implement, and/or the like), unspool a spooled article (e.g., tape, rope, cable, wire, fencing, and/or the like), emit a light (e.g., a laser beam), and/or the like.

As shown in FIG. 3, the vehicle 10 may traverse the boundary of the work area 31. For example, an operator may drive the vehicle 10 along the boundary, or the vehicle 10 may autonomously traverse the boundary (e.g., by successively navigating to each geographic coordinate of a set of geographic coordinates that comprise the boundary of the work area). As used herein, traversing a boundary may refer to traveling a path on the boundary or near the boundary (e.g., within a threshold proximity), such that the boundary can be marked by the vehicle 10 and/or a marking system 20 of the vehicle 10. The marking system 20 may extend from a side of the vehicle 10 (e.g., a left side or a right side), such that the boundary is marked as the vehicle 10 traverses a path near the boundary. In some other implementations, the marking system 20 may operate underneath the vehicle 10, in front of the vehicle 10, or behind the vehicle 10, such that the boundary as marked as the vehicle 10 traverses the exact path of the boundary.

The control system 16 may receive navigation data that indicates the boundary of the work area 31, and may autonomously traverse the boundary using the navigation data. As the vehicle 10 traverses the boundary, the control system 16 may send marking signals 34 to the marking actuator 27. A marking signal 34 causes the marking actuator 27 to mark the boundary at a location. For example, if the boundary is marked using discontinuous markings, such as dropped objects, then the marking signal 34 may cause the marking actuator 27 to place a discontinuous marking (e.g., to drop an object).

In some implementations, the boundary may be marked using continuous markings, such a deposited substance, an impression, and/or an unspooled article that marks the entire boundary without any gaps (e.g., such as gaps between dropped objects). In this case, the control system 16 may transmit the activation signal 33 to cause the marking actuator 27 to start marking using a continuous marking, and may not need to transmit marking signals 34 to cause the marking actuator 27 to mark specific locations. However, in some implementations, different portions of the boundary (e.g., curves, corners, a location where a more dangerous operation is to be performed, and/or the like) may be marked differently. In this case, the control system 16 may transmit a marking signal 34 and/or a marking modification signal 35, as described in more detail below, to cause the marking actuator 27 to mark a portion of the boundary differently from another portion of the boundary.

As further shown in FIG. 3, the vehicle 10 may store, in memory 23, information that identifies marked locations. This information may be used for removal of the marking, as described in more detail below. In the case of a discontinuous marking, the vehicle 10 may store, for example, GPS coordinates that identify a location where a discontinuous marking was placed. In the case of a continuous marking, the vehicle 10 may store information that identifies the boundary of the work area 31, information that identifies a location of any markings that deviate from the boundary of the work area 31 (e.g., due to an obstruction in the path of the vehicle 10 along the boundary), information that identifies a location of a modified marking (e.g., a heavier or thicker deposit of a marking, a different color marking, a wider or different impression, and/or the like). This information may be used, for example, to modify a removal operation of the removal actuator 28 to remove the marking (e.g., to spray more liquid to remove a marking).

As further shown in FIG. 3, as the vehicle 10 traverses the boundary, the control system 16 may send one or more marking modification signals 35 to the marking actuator 27. A marking modification signal 35 causes the marking actuator 27 to mark the boundary, at a location, differently from another location (e.g., for which a marking signal 34 caused the marking actuator 27 to mark the boundary). For example, if the boundary is marked using discontinuous markings, such as dropped objects, then the marking modification signal 35 may cause the marking actuator 27 to drop a different object (e.g., a differently-colored object, a differently-sized object, a differently-shaped object, a different type of object, and/or the like).

As another example, if the boundary is marked using continuous markings, then the marking modification signal 35 may cause the marking actuator 27 to start marking the boundary differently, such as using a different substance, a differently-colored substance, a different article, a different implement (e.g., a wider cutting implement), and/or the like. The control system 16 may transmit a first signal to cause the marking actuator 27 to begin marking the boundary differently, and may later transmit a second signal to cause the marking actuator 27 to stop marking the boundary differently (e.g., and return to marking the boundary using another marking).

The control system 16 may determine when to transmit, to the marking actuator 27, a marking signal 34 and/or a marking modification signal 35. The control system 16 may receive input from an operator (e.g., pressing a button, interacting with a screen, and/or the like), and may transmit a marking signal 34 or a marking modification signal 35 to the marking actuator 27 based on the input.

Additionally, or alternatively, the control system 16 may receive an indication of one or more locations that are to be marked, and/or an indication of a type of marking (e.g., a marking or a modified marking) to be used to mark a location. For example, the control system 16 may receive (e.g., from server 32, based on operator input, and/or the like) GPS coordinates of the one or more locations (e.g., which may be included in navigation data). The control system 16 may compare measured GPS coordinates of the vehicle 10 (e.g., received from GPS component 17) to the indicated GPS coordinates (e.g., which may be stored in memory 23) to determine when to transmit a marking signal 34 and/or a marking modification signal 35 to the marking actuator 27. For example, the control system 16 may transmit such a signal when the GPS coordinates match and/or when the measured GPS coordinates are within a threshold distance of the indicated GPS coordinates.

Additionally, or alternatively, the control system 16 may periodically transmit a signal (e.g., a marking signal 34 or a marking modification signal 35) to the marking actuator 27. For example, the control system 16 may store information that indicates a time periodicity indicating a time between consecutive marking signals, and may transmit the signal according to the time periodicity (e.g., every 1 second, every 5 seconds, every 10 seconds, every 30 seconds, and/or the like). In this case, the control system 16 may use a timer (e.g., of a clock component of the control system 16) to determine when to transmit the signal.

Additionally, or alternatively, the control system 16 may store information that indicates a distance periodicity indicating a distance to be traveled between consecutive marking signals, and may transmit the signal according to the distance periodicity (e.g., every 1 meter, every 5 meters, every 10 meters, every 30 meters, and/or the like). In this case, the control system 16 may interact with the drive system 11 (e.g., an odometer and/or the like) to determine a distance traveled, and may use the distance traveled to transmit the signal.

In some implementations, the control system 16 may determine a proximity of the vehicle 10 to a point on the boundary, such as a corner, a curve, a portion of the boundary indicated as being associated with a dangerous operation, and/or the like. The control system 16 may analyze the work area 31 to determine such a point, may receive input from an operator (e.g., interacting with a touch screen or other input component 24) that indicates such a point, may receive information from another device (e.g., server 32) that indicates such a point, and/or the like. The point may be indicated using GPS coordinates, and the control system 16 may determine a proximity to the point by comparing the GPS coordinates to measured GPS coordinates of the vehicle 10. Based on a proximity to the point, the control system may, for example, transmit a marking modification signal 35 instead of a marking signal 34, may modify a time periodicity (e.g., to mark the boundary more often or less often within proximity of the point), may modify a distance periodicity (e.g., to mark the boundary with markings spaced more closely together or farther apart), and/or the like. In some implementations, the control system 16 may determine that the vehicle 10 is at a corner of the boundary (e.g., based on a GPS coordinate of the vehicle 10, based on detecting that the vehicle 10 has turned, and/or the like), and may transmit a marking signal 34 and/or a marking modification signal 35 based on determining that the vehicle 10 is at the corner, such that the corner is marked. In this way, the control system 16 may more clearly define a boundary and/or may mark dangerous areas with more visible markings.

In some implementations, the control system 16 may receive information indicating a number of available markers (e.g., a number of cones, a number of flags, and/or the like), and may determine locations to be marked based on the number of available markers and/or a size or length of the boundary. For example, the control system 16 may determine a periodicity with which to mark locations, GPS coordinates of the locations to be marked, and/or the like, such that the vehicle 10 is able to mark the entire boundary without running out of markers. As an example, the control system 16 may calculate a spacing between markers based on a length of the boundary and a number of available markers, and may determine locations for the markers based on the spacing. In some implementations, the markers may be evenly spaced. Additionally, or alternatively, the markers may be evenly spaced using a first spacing (e.g., a wider spacing) for a first portion of the boundary (e.g., a straightaway far from a corner), and may be evenly spaced using a second spacing (e.g., a narrower spacing) for a second portion of a boundary (e.g., near a corner).

Additionally, or alternatively, the control system 16 may receive information indicating an amount of a material (e.g., a volume of a substance, a weight of a substance, and/or the like), and may determine locations to be marked based on the amount of the material and/or a size or length of the boundary. For example, the control system 16 may determine an amount of a substance, and may control a manner in which the substance is deposited (e.g., to deposit more or less substance at a particular location) based on the amount.

In some implementations, the control system 16 may determine the number of available markers and/or the amount of material based on input from an operator and/or information received from server 32. Additionally, or alternatively, the control system 16 may determine the number of available markers and/or the amount of material based on one or more measurements of one or more sensors of the vehicle 10, such as a weight sensor, a volume sensor, and/or the like.

As further shown in FIG. 3, the control system 16 may transmit a deactivation signal 36 to the marking actuator 27. The deactivation signal 36 causes the marking actuator 27 to stop marking the boundary. For example, the deactivation signal 36 may cause the marking actuator 27 to stop dropping objects, stop depositing a substance, stop creating an impression in a ground surface, stop unspooling a spooled article, stop emitting a light, and/or the like.

The control system 16 may determine that boundary marking for the work area is to be deactivated, and may transmit the deactivation signal 36 based on the determination. The determination may be based on input from an operator, information received from a server 32, and/or the like. Additionally, or alternatively, the control system 16 may determine that boundary marking is complete, such as by determining that the vehicle 10 has traversed the boundary (e.g., based on comparing a distance traveled to a length of the boundary, based on comparing a measured GPS coordinate to a GPS coordinate of the vehicle 10 when the activation signal 33 was transmitted, and/or the like).

In some implementations, the control system 16 may determine a number of markings (also sometimes referred to herein as markers) used to mark the boundary (e.g., after determining that marking is complete and/or transmitting the deactivation signal 36). The control system 16 may store information that identifies the number of markings in memory 23. This information may later be used for retrieval and/or removal of the markings, such as to ensure that all markings have been retrieved and/or removed, to output an alert (e.g., to an output component 25, to a server 32, and/or the like) when the number of retrieved and/or removed marking is not equal to the number of markings used to mark the boundary, and/or the like.

In some implementations, the control system 16 may wirelessly transmit, using wireless communication component 26, information that identifies marked locations, information that identifies a number of markers used to mark the boundary, and/or the like. Such information may be transmitted to another vehicle, to the server 32, and/or the like. In some cases, the vehicle 10 that marks the boundary may be different from a vehicle that removes the markings, and the information that identifies the marked locations and/or the number of markers may be used by the vehicle that removes the markings.

Figure 4:
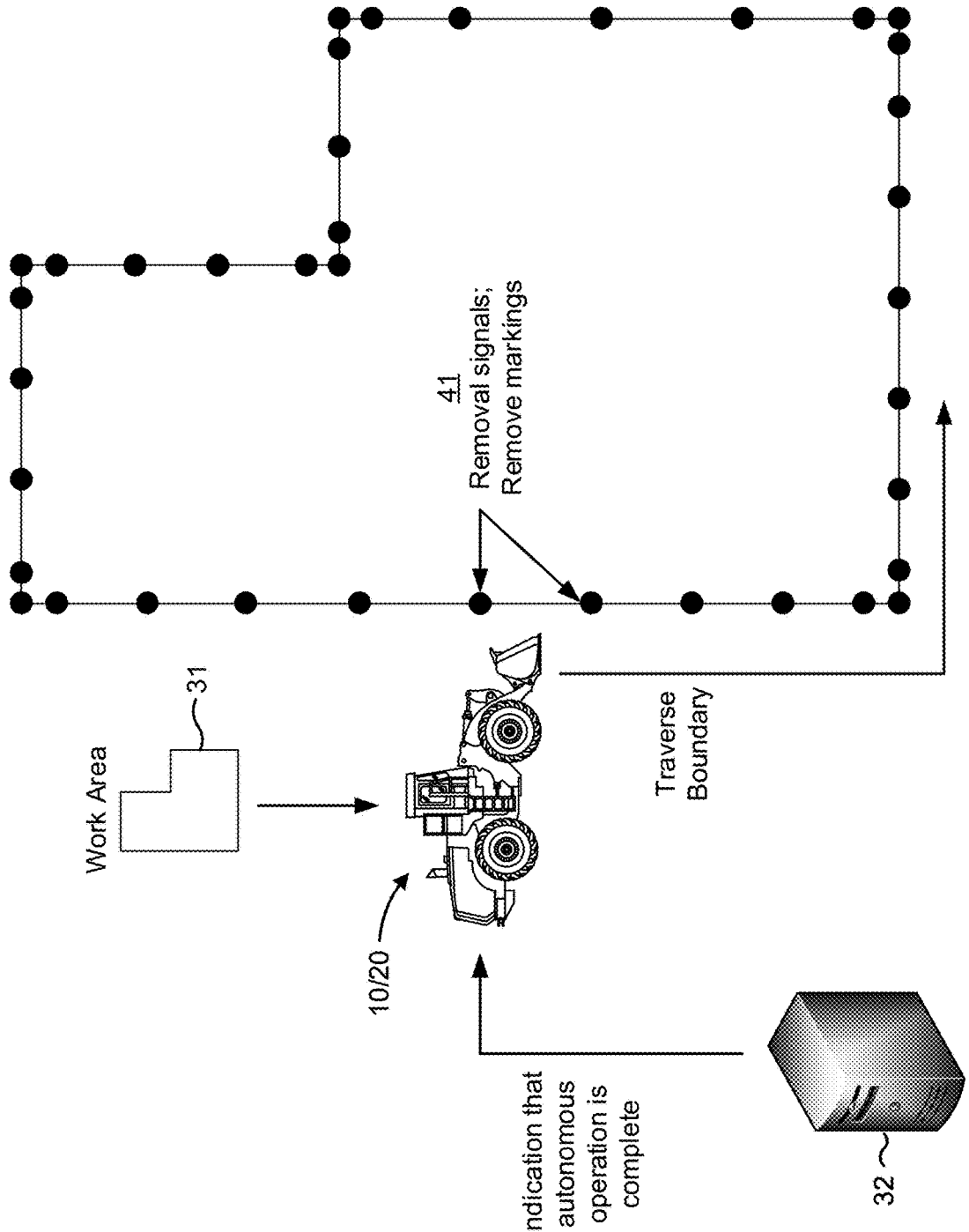
FIG. 4 is a diagram of other example operations performed by the marking system of FIG. 2 and/or the vehicle of FIG. 1.

FIG. 4 is a diagram of example operations performed by marking system 20 and/or vehicle 10. While some operations are described in connection with FIG. 4 as being performed by vehicle 10, one or more of those operations may be performed by marking system 20.

As shown in FIG. 4, the vehicle 10 may receive an indication that an autonomous operation, performed in a work area with a boundary, has been completed. The indication may be received from the server 32. Additionally, or alternatively, the indication may be received from an operator of vehicle 10 (e.g., via input component 24, wireless communication component 26, and/or the like). Additionally, or alternatively, the vehicle 10 may be an autonomous vehicle configured to perform the autonomous operation in the work area 31. In this case, the vehicle 10 may determine that the autonomous operation has been completed.

The vehicle 10 (e.g., the control system 16) may receive an indication of a work area 31 for which markings are to be removed. The vehicle 10 (e.g., a control system 16 of the vehicle 10), may determine a boundary of the work area 31 (e.g., which may be indicated in navigation data, as GPS coordinates, and/or the like), and may autonomously drive to a point on the boundary (e.g., a marked location) to begin removing markings from the boundary.

The control system 16 may determine one or more marked locations along the boundary that have been marked with markings. For example, the control system 16 may retrieve information that identifies the boundary and/or the marked locations from memory 23. As described above in connection with FIG. 3, such information may be stored in memory 23 based on transmission of one or more marking signals 34 to a marking actuator 27 as the vehicle 10 traverses the boundary. Additionally, or alternatively, the control system 16 may receive such information via a wireless communication component 26 (e.g., from the server 32, from a vehicle that marked the locations, and/or the like).

As further shown in FIG. 4, the vehicle 10 may traverse the boundary of the work area 31. For example, an operator may drive the vehicle 10 along the boundary, or the vehicle 10 may autonomously traverse the boundary, as described above in connection with FIG. 3. As the vehicle 10 traverses the boundary, the control system 16 may send one or more removal signals 41 to a removal actuator 28. A removal signal 41 causes the removal actuator 28 to remove a marking from the boundary of the work area (e.g., at a marked location). For example, if the boundary is marked using discontinuous markings, such as dropped objects, then the removal signal 41 may cause the removal actuator 28 to retrieve a discontinuous marking (e.g., to retrieve an object). The removal actuator 28 may retrieve an object at one or more marked locations (e.g., each marked location) of the locations that have been marked. The control system 16 may determine that the vehicle 10 is at a marked location (e.g., based on comparing a measured GPS coordinate to a GPS coordinate of a marked location), and may transmit a removal signal 41 to the removal actuator 28 based on determining that the vehicle 10 is at the marked location.

As another example, if the boundary is marked using continuous markings (e.g., a continuous marking along locations that form the boundary), such a deposited substance, an impression, and/or an unspooled article that marks the entire boundary without any gaps (e.g., such as gaps between dropped objects), then the control system 16 may transmit a removal signal 41 (e.g., a single removal signal 41) to trigger removal of the continuous markings. In this case, the removal actuator 28 may remove the marking(s) by removing or obscuring a substance (e.g., by spraying the substance with a liquid or a gas, by driving over the substance, by sweeping the substance, and/or the like), by removing or obscuring an impression in the ground (e.g., by filling the impression with a material, by driving over the impression, and/or the like), by spooling an article that marks the boundary, and/or the like.

In some implementations, the control system 16 may use computer vision and/or image processing to identify a marking, and may then remove the marking based on identifying the marking. Additionally, or alternatively, the control system 16 may use computer vision and/or image processing to confirm whether a marking was successfully removed. In this case, the control system 16 may include a camera or other type of image capture device, an image processor, and/or the like. Additionally, or alternatively, the control system 16 may use one or more other techniques to identify a marking, such as a proximity sensor, radar, LIDAR, an infrared sensor, and/or the like.

Although FIGS. 3 and 4 are described in connection with a vehicle 10 that traverses the boundary of the work area to mark the boundary, in some implementations, a vehicle may remain stationary while marking the boundary. For example, a vehicle such as a crane may mark the boundary and/or remove markings from the boundary via a boom, an extendable arm, and/or the like.

As indicated above, FIG. 4 is provided as an example. Other examples may differ from what is described in connection with FIG. 4.

FIG. 5 is a diagram illustrating an example process 50 performed, for example, by vehicle 10, control system 16, and/or marking system 20. Example process 50 is an example where vehicle 10, control system 16, and/or marking system 20 performs operations associated with marking a work area boundary for an autonomous vehicle.

As shown in FIG. 5, process 50 may include determining that boundary marking for a work area, of an autonomous vehicle, is to be activated (block 51). For example, the vehicle 10 (e.g., using one or more components of control system 16, marking system 20, and/or the like) may determine that boundary marking for a work area 31 is to be activated, as described above. The work area 31 may be associated with an autonomous vehicle.

As further shown in FIG. 5, process 50 may include transmitting an activation signal to a marking actuator based on determining that boundary marking for the work area is to be activated, the activation signal causing the marking actuator to begin marking a boundary of the work area as a drive system propels the vehicle along the boundary (block 52). For example, the vehicle 10 (e.g., using one or more components of control system 16, marking system 20, and/or the like) may transmit an activation signal 33 to a marking actuator 27, as described above. The vehicle 10 may transmit the activation signal 33 based on determining that boundary marking for the work area 31 is to be activated. The activation signal 33 may cause the marking actuator 27 to begin marking a boundary of the work area 31 as a drive system 11 propels the vehicle 10 along the boundary.

The vehicle 10 may receive navigation data that indicates the boundary of the work area 31, and may autonomously traverse the boundary of the work area 31 based on the navigation data. Thus, in some implementations, the vehicle 10 is the autonomous vehicle associated with the work area 31.

Additionally, or alternatively, the vehicle 10 may transmit an activation signal 33 and/or a deactivation signal 36 to the marking actuator 27 based on the navigation data. The vehicle 10 may determine, based on the navigation data, a plurality of locations along the boundary that are to be marked by the marking actuator 27. The vehicle 10 may transmit a plurality of marking signals 34 to the marking actuator 27 as the vehicle 10 autonomously traverses the boundary. The plurality of marking signals 34 may cause the marking actuator 27 to mark the boundary at the plurality of locations. The vehicle 10 may store information that identifies the plurality of locations as the plurality of marked locations. The vehicle 10 may transmit one or more marking signals 34 based on a time periodicity indicating a time between consecutive marking signals 34, a distance periodicity indicating a distance traveled between consecutive markings of the boundary, a determined proximity to a corner of the boundary, a determined proximity to a particular portion of the boundary, and/or the like.

The vehicle 10 (e.g., using a marking actuator 27) may mark the boundary by dropping an object at one or more of the plurality of marked locations, depositing a substance at one or more of the plurality of marked locations or along the boundary, creating an impression in a ground surface at one or more of the plurality of marked locations or along the boundary, unspooling a spooled article along the boundary, emitting light to indicate the boundary, and/or the like. The plurality of marked locations may include one or more corners of the boundary.

As further shown in FIG. 5, process 50 may include storing information that identifies a plurality of marked locations along the boundary (block 53). For example, the vehicle 10 (e.g., using one or more components of control system 16, marking system 20, and/or the like) may store information that identifies a plurality of marked locations along the boundary, as described above.

As further shown in FIG. 5, process 50 may include determining that boundary marking for the work area is to be deactivated (block 54). For example, the vehicle 10 (e.g., using one or more components of control system 16, marking system 20, and/or the like) may determine that boundary marking for the work area 31 is to be deactivated, as described above.

As further shown in FIG. 5, process 50 may include transmitting a deactivation signal to the marking actuator based on determining that boundary marking for the work area is to be deactivated, the deactivation signal causing the marking actuator to stop marking the boundary (block 55). For example, the vehicle 10 (e.g., using one or more components of control system 16, marking system 20, and/or the like) may transmit a deactivation signal 36 to the marking actuator 27, as described above. The vehicle 10 may transmit the deactivation signal 36 based on determining that boundary marking for the work area 31 is to be deactivated. The deactivation signal 36 may cause the marking actuator 27 to stop marking the boundary.

The vehicle 10 may determine a number of markings used to mark the boundary, and may store information that identifies the number of markings in memory 23. The information that identifies the number of markings may be used to remove the markings from the boundary. The vehicle 10 may be configured to wirelessly transmit, to another vehicle or to a device external from the vehicle 10, a number of markings used to mark the boundary or the information that identifies the plurality of marked locations.

The vehicle 10 may remove markings from the boundary of the work area 31, as described in more detail below in connection with FIG. 6. For example, the vehicle 10 (e.g., using a removal actuator 28) may receive an indication that an autonomous operation, performed in the work area 31, has been completed, and may transmit a removal signal 41 to a removal actuator 28 based on receiving the indication that the autonomous operation has been completed. The removal signal 41 may cause the removal actuator 28 to remove the markings from the boundary as the vehicle 10 traverses the boundary.

The vehicle 10 may remove the markings from the plurality of marked locations. For example, the vehicle 10 may remove the markings by retrieving an object at each of the plurality of marked locations, removing or obscuring a substance at each of the plurality of marked locations or along the boundary, removing or obscuring an impression in a ground surface at each of the plurality of marked locations or along the boundary, spooling an article that marks the boundary, and/or the like.

Although FIG. 5 shows example blocks of process 50, process 50 may include additional blocks, fewer blocks, different blocks, or differently arranged blocks than those depicted in FIG. 5. Additionally, or alternatively, two or more of the blocks of process 50 may be performed in parallel. Furthermore, process 50 may include one or more operations described elsewhere herein, such as one or more operations described below in connection with FIG. 6.

FIG. 6 is a diagram illustrating an example process 60 performed, for example, by vehicle 10, control system 16, and/or marking system 20. Example process 60 is an example where vehicle 10, control system 16, and/or marking system 20 performs operations associated with removing markings from a work area boundary for an autonomous vehicle.

As shown in FIG. 6, process 60 may include receiving an indication that an autonomous operation, performed in a work area, has been completed (block 61). For example, the vehicle 10 (e.g., using one or more components of control system 16, marking system 20, and/or the like) may receive an indication that an autonomous operation, performed in a work area 31, has been completed, as described above.

As shown in FIG. 6, process 60 may include determining a boundary of the work area (block 62). For example, the vehicle 10 (e.g., using one or more components of control system 16, marking system 20, and/or the like) may determine a boundary of the work area 31, as described above. The boundary of the work area 31 may be determined based on information stored in memory 23 associated with the vehicle 10. Additionally, or alternatively, the boundary of the work area 31 may be determined based on information received from another vehicle or from a device external from the vehicle 10.

As shown in FIG. 6, process 60 may include determining a plurality of marked locations, along the boundary, that have been marked with a corresponding plurality of markings (block 63). For example, the vehicle 10 (e.g., using one or more components of control system 16, marking system 20, and/or the like) may determine a plurality of marked locations, along the boundary, that have been marked with a corresponding plurality of markings, as described above. The plurality of marked locations may be determined based on information stored in memory 23 associated with the vehicle 10. Additionally, or alternatively, the plurality of marked locations may be determined based on information received from another vehicle or from a device external from the vehicle 10.

The information may be stored in the memory 23 based on transmission of a plurality of marking signals 34 to a marking actuator 27 as the vehicle 10 traverses the boundary. Each marking signal 34 may cause the marking actuator 27 to mark the boundary at a different location.

As shown in FIG. 6, process 60 may include transmitting, based on receiving the indication that the autonomous operation has been completed, a plurality of removal signals to a removal actuator as a vehicle traverses the boundary, the plurality of removal signals causing the removal actuator to remove the plurality of markings from the boundary of the work area (block 64). For example, the vehicle 10 (e.g., using one or more components of control system 16, marking system 20, and/or the like) may transmit a plurality of removal signals 41 to a removal actuator 28 as the vehicle 10 traverses the boundary, as described above. The vehicle 10 may transmit the plurality of removal signals 41 based on receiving the indication that the autonomous operation has been completed. The plurality of removal signals 41 may cause the removal actuator 28 to remove the plurality of markings from the boundary of the work area 31.

The vehicle 10 (e.g., the removal actuator 28) may remove the plurality of markings by retrieving an object at each of the plurality of marked locations, removing or obscuring a substance at each of the plurality of marked locations or along the boundary, removing or obscuring an impression in a ground surface at each of the plurality of marked locations or along the boundary, spooling an article that marks the boundary, and/or the like.

Although FIG. 6 shows example blocks of process 60, process 60 may include additional blocks, fewer blocks, different blocks, or differently arranged blocks than those depicted in FIG. 6. Additionally, or alternatively, two or more of the blocks of process 60 may be performed in parallel. Furthermore, process 60 may include one or more operations described elsewhere herein, such as one or more operations described above in connection with FIG. 5.

INDUSTRIAL APPLICABILITY

Vehicle 10, marking system 20, and/or control system 16, as described herein, may be utilized for methods of marking a work area boundary of an autonomous vehicle. When autonomous vehicles are used at a work site, special care must be taken to avoid collisions of the autonomous vehicle with other objects, including people, other vehicles, and/or the like. The likelihood of a collision may be reduced by marking a boundary of a work area, such as by using the techniques described herein. In some cases, the techniques described herein may reduce errors associated with boundary marking by using marking system 20 to precisely mark the boundary. Furthermore, some techniques described herein may mark the boundary based on characteristics of the boundary, which may improve safety. Some techniques described herein may ensure that sufficient markings and/or materials are available to completely mark the boundary, and/or may modify boundary marking to ensure that the boundary can be completely marked.

Some techniques described herein may use an autonomous vehicle to mark the boundary while the autonomous vehicle traverses a boundary of a work area in which the autonomous vehicle is to perform operations (e.g., autonomous operations). The autonomous vehicle may store information identifying the boundary in memory, and may use that information to remain within the work area while performing the operations. By marking the boundary work area while the autonomous vehicle learns the boundary, resources may be conserved, such as resources used to propel the autonomous vehicle around the boundary (e.g., fuel, electric power, and/or the like), which would otherwise be used to traverse the boundary multiple times.

The detailed description of example implementations of the disclosure herein makes reference to the accompanying drawings and figures, which show the example implementations by way of illustration only. While these example implementations are described in sufficient detail to enable those skilled in the art to practice the disclosure, it should be understood that other implementations may be realized and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation.

What is claimed is:

1. A system comprising:
   a memory;
   a marking actuator configured to mark a boundary of a work area reserved for an autonomous operation of a vehicle that includes the system; and
   a controller configured to:
     receive an indication that boundary marking for the work area is to be activated;

transmit an activation signal to the marking actuator based on receiving the indication that boundary marking for the work area is to be activated,
the activation signal causing the marking actuator to begin marking the boundary as the vehicle traverses the boundary;
store, in the memory, information that identifies a plurality of marked locations along the boundary;
determine that boundary marking for the work area is to be deactivated; and
transmit a deactivation signal to the marking actuator based on determining that boundary marking for the work area is to be deactivated,
the deactivation signal causing the marking actuator to stop marking the boundary, and
the marking actuator being configured to mark the boundary by:
dropping objects to provide discontinuous markings,
depositing chalk or paint,
creating an impression in a ground surface at one or more of the plurality of marked locations or along the boundary, or
unspooling a spooled article along the boundary.

2. The system of claim 1, wherein the controller is further configured to:
transmit a plurality of marking signals to the marking actuator as the vehicle traverses the boundary, different marking signals causing the marking actuator to mark the boundary at different locations; and
store, in the memory, information that identifies the location as one of the plurality of marked locations.

3. The system of claim 2, wherein one or more marking signals, of the plurality of marking signals, are transmitted to the marking actuator based on:
a time periodicity indicating a time between consecutive marking signals,
a distance periodicity indicating a distance traveled between consecutive markings of the boundary,
a determined proximity to a corner of the boundary, or
a determined proximity to a particular portion of the boundary.

4. The system of claim 1, further comprising a removal actuator configured to remove markings from the boundary of the work area; and
wherein the controller is further configured to:
receive an indication that an autonomous operation, performed in the work area, has been completed; and
transmit a removal signal to the removal actuator based on receiving the indication that the autonomous operation has been completed, the removal signal causing the removal actuator to remove the markings from the boundary as the vehicle traverses the boundary.

5. The system of claim 4, wherein the markings are removed from the plurality of marked locations.

6. The system of claim 4, wherein the removal actuator is configured to remove the markings by:
retrieving an object at each of the plurality of marked locations,
removing or obscuring a substance at each of the plurality of marked locations or along the boundary,
removing or obscuring an impression in a ground surface at each of the plurality of marked locations or along the boundary, or
spooling an article that marks the boundary.

7. The system of claim 1, wherein the plurality of marked locations include one or more corners of the boundary.

8. The system of claim 1, wherein the marking actuator includes one or more of an object dropper, a flag setter, or a paint sprayer.

9. A vehicle, comprising:
a drive system;
a marking actuator configured to mark a boundary of a work area of an autonomous vehicle; and
a control system configured to:
determine that boundary marking for the work area is to be activated;
transmit an activation signal to the marking actuator based on determining that boundary marking for the work area is to be activated,
the activation signal causing the marking actuator to begin marking the boundary as the drive system propels the vehicle along the boundary;
store information that identifies a plurality of marked locations along the boundary;
determine that boundary marking for the work area is to be deactivated; and
transmit a deactivation signal to the marking actuator based on determining that boundary marking for the work area is to be deactivated,
the deactivation signal causing the marking actuator to stop marking the boundary, and
the marking actuator being configured to mark the boundary by:
dropping objects to provide discontinuous markings,
depositing chalk or paint,
creating an impression in a ground surface at one or more of the plurality of marked locations or along the boundary, or
unspooling a spooled article along the boundary.

10. The vehicle of claim 9,
wherein the vehicle is configured to:
receive navigation data that indicates the boundary of the work area; and
autonomously traverse the boundary of the work area based on the navigation data; and
wherein the control system is further configured to:
transmit the activation signal and the deactivation signal to the marking actuator based on the navigation data.

11. The vehicle of claim 10, wherein the control system is further configured to:
determine, based on the navigation data, a plurality of locations along the boundary that are to be marked by the marking actuator;
transmit a plurality of marking signals to the marking actuator as the vehicle autonomously traverses the boundary, the plurality of marking signals causing the marking actuator to mark the boundary at the plurality of locations; and
store information that identifies the plurality of locations as the plurality of marked locations.

12. The vehicle of claim 9, wherein the control system is further configured to:
determine a number of markings used to mark the boundary; and
store information that identifies the number of markings in memory, wherein the information that identifies the number of markings is used to remove the markings from the boundary.

13. The vehicle of claim 9, wherein the vehicle is the autonomous vehicle.

14. The vehicle of claim 9, wherein the vehicle is configured to wirelessly transmit, to another vehicle or to a device external from the vehicle, a number of markings used to mark the boundary or the information that identifies the plurality of marked locations.

15. A method performed by a control system of a vehicle, comprising:
- determining, by the control system, a work area reserved for an autonomous operation;
- transmitting, by the control system, one or more signals to a marking actuator based on determining the work area,
  - the one or more other signals causing the marking actuator to begin marking a boundary of the work area as the vehicle traverses the boundary of the work area; and
- storing, by the control system, information that identifies a plurality of marked locations along the boundary of the work area,
  - the plurality of marked locations being marked by:
    - dropping of objects to provide discontinuous markings,
    - depositing of chalk or paint,
    - creating of an impression in a ground surface at one or more of the plurality of marked locations or along the boundary, or
    - unspooling of a spooled article along the boundary.

16. The method of claim 15, wherein the information is stored in a memory based on transmission of the one or more signals to the marking actuator.

17. The method of claim 15, wherein the work area is determined based on information received from another vehicle or from a device external from the vehicle.

18. The method of claim 15, wherein the boundary is defined by a set of geographic coordinates; and
- wherein the vehicle is configured to traverse the boundary by successively navigating to each geographic coordinate of the set of geographic coordinates.

19. The method of claim 15, further comprising:
- receiving an indication that the autonomous operation has been completed; and
- transmitting, based on receiving the indication that the autonomous operation has been completed, a plurality of removal signals to a removal actuator as the vehicle traverses the boundary.

20. The method of claim 15, wherein the plurality of removal signals cause the removal actuator to remove markings from the boundary of the work area.

* * * * *